W. P. BAILEY.
WHEEL RIM.
APPLICATION FILED JUNE 7, 1915.

1,174,380.

Patented Mar. 7, 1916.

WITNESSES:
Charles Rickles
Thos Castberg.

INVENTOR
William P. Bailey
BY Strong & Townsend
ATTORNEYS

UNITED STATES PATENT OFFICE.

WILLIAM P. BAILEY, OF MILL VALLEY, CALIFORNIA.

WHEEL-RIM.

1,174,380.

Specification of Letters Patent.

Patented Mar. 7, 1916.

Application filed June 7, 1915. Serial No. 32,653.

*To all whom it may concern:*

Be it known that I, WILLIAM P. BAILEY, a citizen of the United States, residing at Mill Valley, in the county of Marin and State of California, have invented new and useful Improvements in Wheel-Rims, of which the following is a specification.

This invention relates to wheel rims, and has for its object to improve and simplify the construction thereof.

In carrying out this object, I employ a detachable rim flange provided with spaced recesses on its circumference and a series of clips carried on the felly to register with the recesses whereby, when the rim flange is received upon the felly, it may be turned to position where the clips and recesses are out of register and is thereby held thereon, and improved means for locking the rim flange against accidental turning to re-aline the recesses with the clips.

One form which my invention may assume is exemplified in the following description and illustrated in the accompanying drawings, in which—

Figure 1:
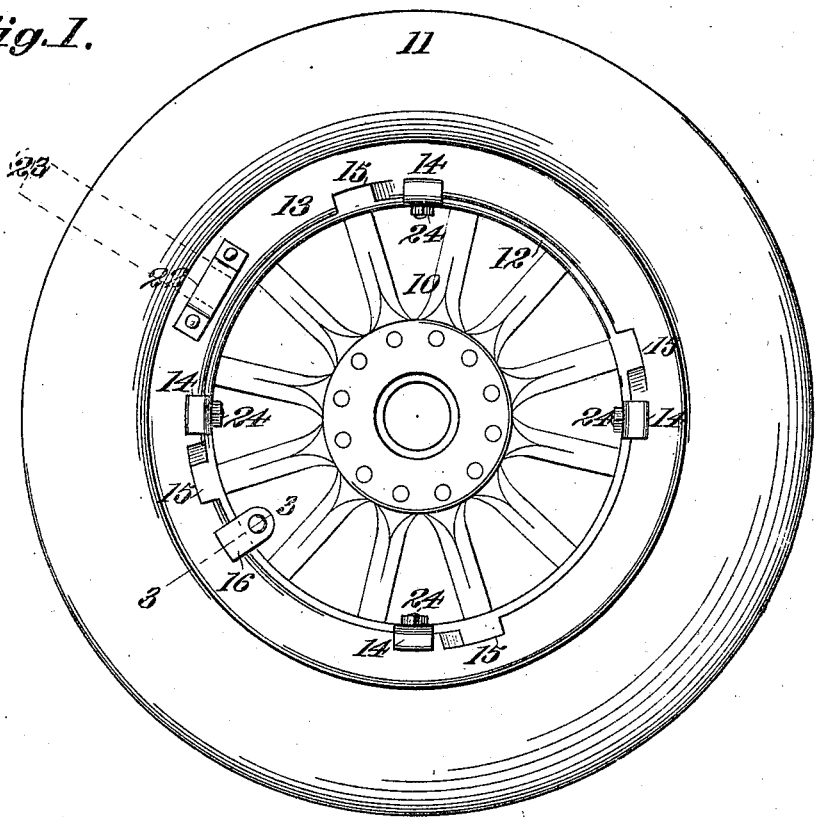
Figure 2:
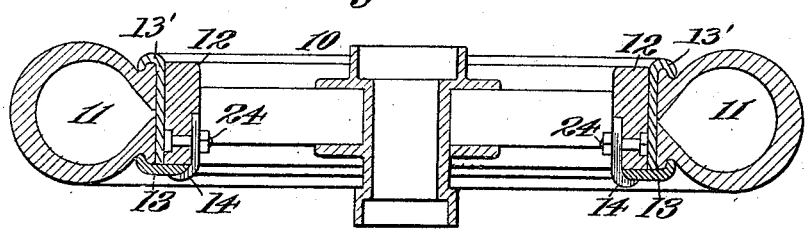
Figure 3:
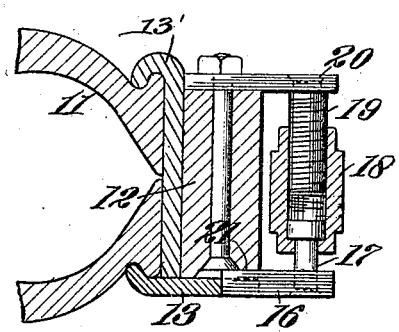

Figure 1 shows a side elevation of an automobile wheel embodying my invention. Fig. 2 shows a central cross sectional view of the same. Fig. 3 shows a detail sectional view taken on the line 3—3 of Fig. 1.

In the drawings I have shown a wheel 10, carrying a tire 11, the felly 12 of which is carried upon the spokes of the wheel. The rim, comprising the annulus 13' and the removable flange 13, by means of which latter the tire is removably held in place, encircles the felly and is supported thereby.

It is important that simple and quickly operable means be provided for locking the removable flange in position upon the felly, and this I provide for by means of a series of clips 14 arranged in spaced order on the felly and a series of similarly spaced recesses 15 formed on the inner edges of the removable rim flange 13. When the recesses are properly positioned with respect to the clips, the rim flange, obviously, may be fitted closely against the felly, and, when turned a short distance thereon to throw the recesses and clips out of register, it will be held against lateral movement on the felly. In order, however, that the rim flange may not accidentally turn rotatably upon the felly and thereby re-aline the recesses with the clips, I provide a simple and improved locking device in the form of an adjustable block 16, having a stud portion 17, on the end of which is a freely rotatable, screw-threaded cap 18 adapted to be screwed upon a bolt 19 rigidly carried by means of a bracket or arm 20 upon the felly. The block is so positioned relative to one of the clips 14 that a slight turn of the movable rim flanges serve to bring one of the recesses 15 into register therewith. The block is thereupon moved into position within the recess and the screw-threaded cap 18 is turned to draw said block inwardly until it enters a keeper or depression 21 formed upon the adjacent side of the felly. The block so engaged positively locks the rim flanges against any turning movement.

To unlock the rim flanges it is only necessary to unscrew the cap 18, permitting the block to be raised out of its keeper or depression 21, whereupon it may be swung inwardly on its pivotal mounting 17 in a manner to clear the felly and rim flange. For enabling the operator to more easily rotate the removable rim flange I employ a socket member 22, secured to the flange and adapted to receive an iron or wrench 23, whereby greater leverage is afforded.

In practice, the clips 14 are metallic L-shaped members, the leg portions of which are secured to the felly by means of screws or rivets 24, with the base portion 25 turned outwardly to engage the inner edge of the removable rim flange. In order to secure a clamping action of the rim flange upon the felly, I may bevel one corner of each of the recesses, as shown at 26, so that as the flange is turned upon the felly to disaline the recesses and clips the beveled portion will pass under the clip and thrust the rim flange tightly against the felly.

It is believed that the operation and advantages of my device are thoroughly understood from the foregoing.

While I have shown and described but one form of the device herein, it is nevertheless understood that the same is susceptible of modification and, therefore, many changes in the various details of construction may be resorted to without departing from the spirit of my invention as disclosed in the appended claims.

Having thus described my invention, what I claim and desire to secure by Letters Patent is—

1. A wheel having a felly provided with a keeper, a rim arranged on the felly to secure a tire thereon and including a detachable rim flange provided with a plurality of recesses circumferentially spaced, a plurality of clips secured to the felly and projecting outwardly therefrom to register with and enter the recesses of the flange whereby, when the latter is rotated on the felly, the flange will be retained on the felly, one of the recesses of the flange registering with the keeper of the felly, and means for locking the flange against relative rotary movement on the felly comprising a rotatable block mounted on the felly and adapted to enter the keeper of the latter through the registering recess of the flange, and means for moving the block into and out of the keeper.

2. A wheel having a felly provided with a keeper, a rim arranged on the felly to secure a tire thereon, and including a detachable rim flange provided with a plurality of recesses circumferentially spaced, a plurality of clips secured to the felly and projecting outwardly therefrom to register with and enter the recesses of the flange whereby, when the latter is rotated on the felly, the flange will be retained on the felly, one of the recesses of the flange registering with the keeper of the felly, and means for locking the flange against relative rotary movement on the felly comprising a block member adapted to enter the keeper through the registering recess of the flange; and screw threaded means for advancing the block into the keeper.

3. A wheel having a felly, a rim thereon including a removable flange having a plurality of recesses in its inner edge and a peripheral tire-retaining portion on its outer edge, and a plurality of clips carried by the felly and having their outer end portions laterally spaced therefrom to receive the removable flange when the latter is rotated to disaline the clips and flange recesses.

4. A wheel having a felly provided with a keeper, a rim arranged on the felly to secure a tire thereon and including a detachable rim flange provided with a plurality of recesses circumferentially spaced, a plurality of clips secured to the felly and projecting outwardly therefrom to register with and enter the recesses of the flange whereby, when the latter is rotated on the felly, the flange will be retained on the felly, one of the recesses of the flange registering with the keeper of the felly, and means for locking the flange against relative rotary movement on the felly comprising a rotatable block adapted to enter the keeper through the registering recess of the flange, an arm carried by the felly, a bolt carried by the arm, a stud fixed on the block, and a screw-threaded cap freely rotatable on the stud and engaging with the bolt to advance the block into the keeper.

5. A wheel having a felly provided with a keeper, a rim on the felly including a detachable flange, means on the felly for engaging with the rim flange to hold the latter in place, said rim flange being adapted for rotary movement to engage with the aforesaid means and provided with a recess registrable with the keeper of the felly when the rim flange is engaged with said means, means movable on the felly for entering its keeper and the flange recess when in registration to lock the flange against rotation on the felly, and means for moving said last means into the registering keeper and flange recess.

6. In a wheel, a felly, a rim thereon including a flange removable by rotary movement and having a recess therein, a locking member comprising a part to be moved axially into and out of the flange recess and an angular part extending over the inner periphery of the felly, and means slidably engaged with the angular part of the locking member and adjustably securing the same to the felly.

In testimony whereof I have hereunto set my hand in the presence of two subscribing witnesses.

WILLIAM P. BAILEY.

Witnesses:
F. E. LOCKWOOD,
JOHN J. SPOTTISWOOD.

Copies of this patent may be obtained for five cents each, by addressing the "Commissioner of Patents, Washington, D. C."